United States Patent
Joseph et al.

(10) Patent No.: US 12,462,249 B2
(45) Date of Patent: Nov. 4, 2025

(54) SYSTEM AND METHODS FOR PAYMENT VERIFICATION BEFORE EXIT

(71) Applicant: CUST2MATE LTD., Tel Aviv (IL)

(72) Inventors: Bentsur Joseph, Tel Aviv (IL); Amnon Peleg, Tel Aviv (IL)

(73) Assignee: CUST2MATE LTD., Tel Aviv (IL)

( * ) Notice: Subject to any disclaimer, the term of this patent is extended or adjusted under 35 U.S.C. 154(b) by 183 days.

(21) Appl. No.: 18/280,809

(22) PCT Filed: Mar. 10, 2022

(86) PCT No.: PCT/IL2022/050270
§ 371 (c)(1),
(2) Date: Sep. 7, 2023

(87) PCT Pub. No.: WO2022/190101
PCT Pub. Date: Sep. 15, 2022

(65) Prior Publication Data
US 2024/0144266 A1  May 2, 2024

Related U.S. Application Data

(60) Provisional application No. 63/158,906, filed on Mar. 10, 2021.

(51) Int. Cl.
*G06Q 20/40* (2012.01)
*B62B 5/00* (2006.01)
*G06Q 20/20* (2012.01)

(52) U.S. Cl.
CPC ........... *G06Q 20/40* (2013.01); *B62B 5/0096* (2013.01); *G06Q 20/208* (2013.01)

(58) Field of Classification Search
CPC .... G06Q 20/40; G06Q 20/208; G06Q 20/202; G06Q 30/018; B62B 5/0096; G07G 1/009
See application file for complete search history.

(56) References Cited

U.S. PATENT DOCUMENTS 8,360,207 B1 * 1/2013 Goodwin, III ......... G07G 1/009
340/572.1
2012/0320199 A1   12/2012 Kundu et al.
(Continued)

FOREIGN PATENT DOCUMENTS

CN           107563872 A       1/2018

OTHER PUBLICATIONS

PCT Search Report for International Application No. PCT/IL2022/050270 mailed Jun. 15, 2022, 3 pp.
(Continued)

*Primary Examiner* — Florian M Zeender
*Assistant Examiner* — Denisse Y Ortiz Roman
(74) *Attorney, Agent, or Firm* — The Roy Gross Law Firm, LLC; Roy D. Gross

(57) ABSTRACT

A system and methods for shopping checkout includes shopping carts, on which are affixed one or more shopping cart identification (ID) tags; a checkout counter that includes a payment register and a checkout processor, and a store exit that includes an exit ID tag reader, an exit processor, and an alert device. The checkout processor is configured to receive payment approvals from the payment register, to receive ID values of shopping cart ID tags, and responsively to generate shopping cart approval records. The exit processor is configured to determine ID values of shopping cart ID tags from output of the exit ID tag reader, to confirm whether or not the ID values correspond to the shopping cart approval records, and, if not to signal a lack of approval at the alert device.

10 Claims, 2 Drawing Sheets

(56) References Cited

U.S. PATENT DOCUMENTS

| | | | |
|---|---|---|---|
| 2013/0277423 A1 | 10/2013 | Toyokawa et al. | |
| 2016/0300457 A1* | 10/2016 | Aldahbaj | G07G 1/0054 |
| 2019/0279185 A1* | 9/2019 | Cheng | B62B 5/0096 |
| 2021/0042816 A1 | 2/2021 | Chomley et al. | |

OTHER PUBLICATIONS

PCT Written Opinion for International Application No. PCT/IL2022/050270 mailed Jun. 15, 2022, 5 pp.

Behnam Rahnama et al: "Securing RFID-based authentication systems using ParseKey+" Security of Information and Networks, ACM, 2 Penn Plaza, Suite 701 New York NY 10121-0701 USA, Sep. 7, 2010 (Sep. 7, 2010)—pp. 212-217, XP058270485, DOI: 10.1145/1854099.1854142 ISBN: 978-1-4503-0234-0.

Anonymous: "Electronic article surveillance—Wikipedia", Feb. 25, 2021 (Feb. 25, 2021), XP093242019, Retrieved from the Internet: URL:https://en.wikipedia.org/w/index.php?title=Electronic_article_surveillance&oldid=1008949775—the whole document.

* cited by examiner

SYSTEM AND METHODS FOR PAYMENT VERIFICATION BEFORE EXIT

CROSS REFERENCE TO RELATED APPLICATIONS

This application is the U.S. National Phase under 35 U.S.C. § 371 of International Application No. PCT/IL2022/050270 filed Mar. 10, 2022, which claims the benefit of U.S. Provisional Application No. 63/158,906 filed Mar. 10, 2021. Any and all applications for which a foreign or domestic priority claim is identified above and/or in the Application Data Sheet as filed with the present application are hereby incorporated by reference under 37 CFR 1.57.

FIELD OF THE INVENTION

The present invention relates to shopping checkout procedures and in particular to checking out with a shopping cart.

BACKGROUND

Markets and other types of stores seek ways to improve the speed and efficiency of the shopping experience, including the checkout process. Improving the checkout process can reduce the time and associated costs for both shoppers and store owners. For example, shopping carts may be designed to facilitate autonomous shopping, by including scales and scanners. However, store owners are still concerned about shoppers leaving a store without paying. Enhancing the verification of payment may increase the reliability and security of the shopping process, whether the checkout process is an autonomous, self-checkout process or a traditional process operated by a human checkout clerk.

SUMMARY

Embodiments of the present invention provide a shopping cart or collection cart and an integrated check-out system, for controlling a checkout process, and in particular, for monitoring shopping cart usage. A system for shopping checkout is provided that may include: shopping carts, on which are affixed one or more shopping cart identification (ID) tags, including at least an electronic ID tag; a checkout counter comprising: a payment register and a checkout processor, and a store exit comprising an exit ID tag reader, an exit processor, and an automatic barrier. The checkout processor is configured to receive payment approvals from the payment register, to receive an ID of an electronic ID tag, and responsively to signal a checkout ID tag reader to write an approval indication to the electronic ID tag. The exit processor is configured to determine an ID of the shopping cart electronic ID tag from output of the exit ID tag reader to read the approval indication from the electronic ID tag, confirming that the shopping cart is approved to exit, responsively to the approval, to open the automatic barrier to permit the shopping cart to exit, and to signal the exit ID tag reader to reset the approval indication of the electronic ID tag, to require the shopping cart to subsequently pass the checkout counter in order re-exit.

In some embodiments, the shopping cart ID tags may include visible character tags. The exit ID tag reader may be a camera configured to scan the shopping cart ID tags to generate images of the visible character tags, and the exit processor may be configured to perform optical character recognition to identify the ID values from the images.

In some embodiments, the shopping cart ID tags may include bar codes, and the ID value is a computer-readable code generated by the checkout ID reader.

In some embodiments, the shopping cart ID tags may include RFID tags, and the exit ID reader is an RFID reader.

Signaling the lack of approval at the alert device may include issuing an electronic, visual, or audible alert.

The checkout counter may also include a checkout ID tag reader. The checkout processor may be configured to receive the values of the shopping cart ID tags from the checkout ID tag reader.

In some embodiments, the exit further includes an automatic barrier. The exit processor may be further configured to operate the automatic barrier according to whether or not the ID values correspond to the shopping cart approval records, and wherein the automatic barrier is one of a door, gate, turnstile, or bollard.

There is also provided, by embodiments of the present invention, a method for shopping checkout including: affixing a shopping cart identification (ID) tag to a shopping cart; at a checkout counter having a payment register and a checkout processor, receiving payment approval at the checkout processor from the payment register, receiving an ID of an electronic ID tag, and responsively signaling a checkout ID tag reader to write an approval indication to the electronic ID tag. The method further includes, at an exit processor configured to determine an ID of the shopping cart electronic ID tag from output of the exit ID tag reader, reading the approval indication from the electronic ID tag, confirming that the shopping cart is approved to exit, responsively to the approval, opening the automatic barrier to permit the shopping cart to exit, and signaling the exit ID tag reader to reset the approval indication of the electronic ID tag, to require the shopping cart to subsequently pass the checkout counter in order to re-exit.

BRIEF DESCRIPTION OF DRAWINGS

The present invention will be understood and appreciated more fully from the following detailed description taken in conjunction with the appended drawings in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Embodiments of the present invention provide a system and methods for improving validation of a shopper's payment before a shopper exits a store with a shopping cart of products. Illustrative embodiments of the invention are described below. In the interest of clarity, not all features or components of an actual implementation are necessarily described. Embodiments and/or limitations featured in the figures are chosen for convenience or clarity of presentation and are not meant to limit the scope of the invention.

Figure 1:
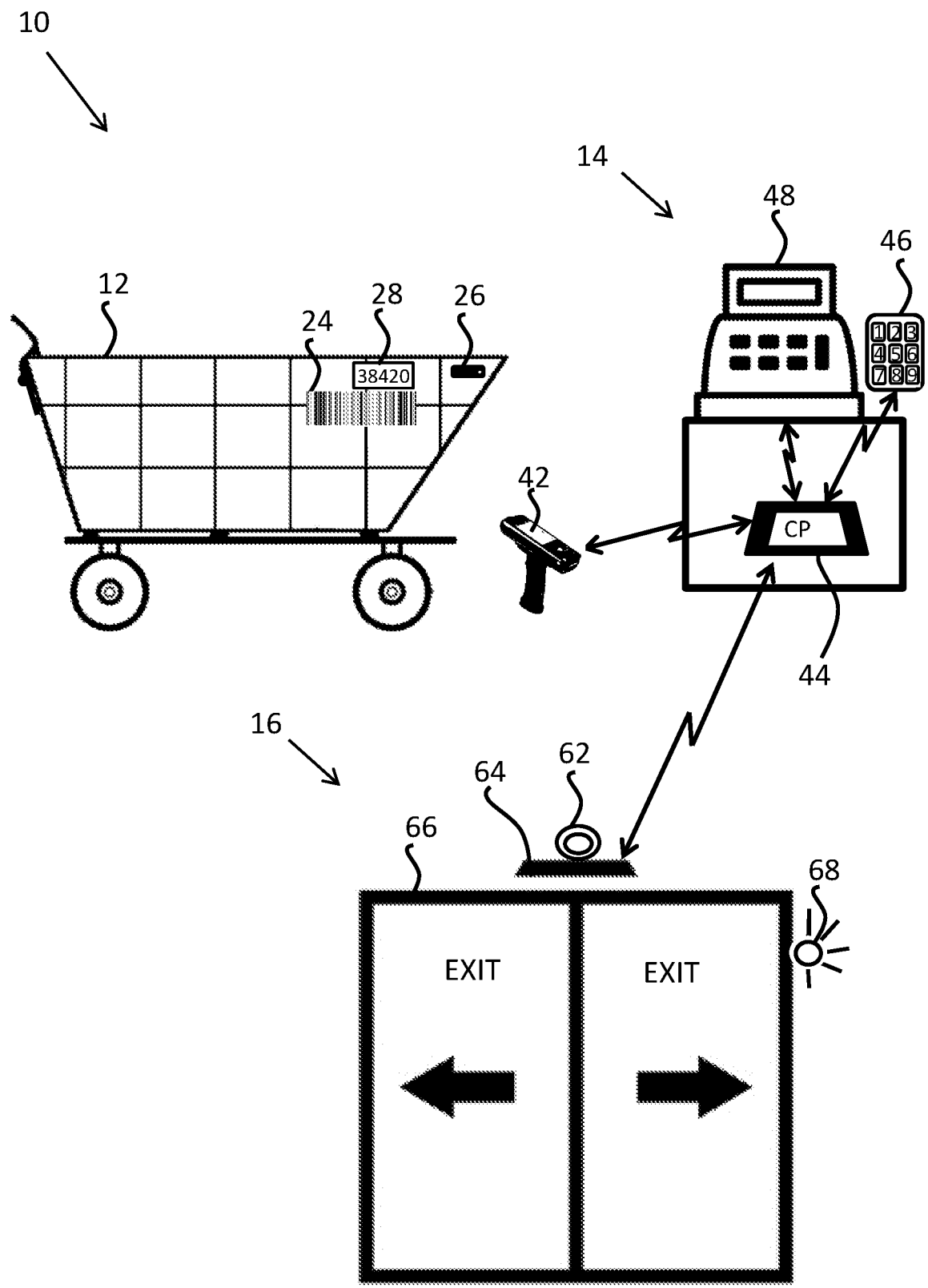
FIG. 1 is a schematic diagram of a shopping checkout system for verifying shopper payment, in accordance with embodiments of the present invention.

FIG. 1 is a schematic diagram of a checkout system 10 for verifying shopper payment, in accordance with embodiments of the present invention. A store employs shopping carts such as shopping cart 12 so that shoppers can conveniently transport products from the store's shelves to a checkout counter 14, and, after payment at the checkout counter, transport the products through a store exit 16 to an external means of transporting the products, such as a shopper's vehicle outside the store. Shopping cart 12 typically includes standard shopping cart features, such as a basket, resting on a frame with wheels, and a handle by which to push the cart. Additional features may include wheel brakes, as well as a chain lock for releasing the cart from a group of carts upon insertion of a coin (not shown).

In embodiments of the present invention, the shopping cart 12 is further equipped with one or more identification tags (ID tags), and each shopping cart in the system is assigned a unique ID. These may be tags capable of remote scanning known in the art, for example: a bar code 24, which may also be, for example, a QR code tag; an electronic ID tag 26, which may also be, for example, radio-frequency identification (RFID) tag, a near-field communication (NFC) tag, or a magnetic tag; and a visible character tag 28, which may display a number or an alphanumeric set of characters. The electronic ID tag 26, which is configured to store and transmit an identification of the shopping cart, may also be a read-write RFID tag configured to receive, store, and subsequently transmit an approval indication, as described further hereinbelow. Alternatively, electronic ID tag 26 may include two contact and/or contactless tags, one for storing the shopping cart ID and a second for storing the approval indication.

The store may also employ, at the checkout counter 14, a checkout clerk, or the shopper may, at a self-checkout counter, record products collected in the shopping cart and make an appropriate payment.

In embodiments of the present invention, a checkout ID tag reader 42 is positioned to scan the electronic ID tag of a shopping cart when the shopping cart is next to the checkout counter. The checkout ID tag reader 42 may also be a bar code reader, for reading the bar code 24 (for example, generating a computer-readable code from the bar code), an RFID tag reader, for reading the electronic tag 26, and/or a camera having digital image or video output, which is subsequently processed by optical character recognition (OCR) to determine the value of the visible character tag 28.

For security, the electronic ID tag 26 may be positioned in a non-obvious position on the shopping cart, such as in a sign at the side of the shopping cart that may also indicate a store logo. An ID tag that must be visible to be read, such as a bar code or visible character tag, may be positioned prominently on a side or front of the shopping cart. Alternatively, or additionally, the visible ID tag may be placed under the basket of the shopping cart, so as to be read by a visible tag reader (e.g., a bar code reader or camera) that is positioned at the checkout counter at a level beneath the level of the basket, or in the floor. OCR processing may be performed by a camera itself or by an external processor or controller, such as a checkout computer processor (CP) 44, which may also be configured to receive the values read by the checkout ID tag reader 42 (i.e., the bar code reader, the RFID reader, and/or the camera) and to record a respective identifying value of the shopping cart in a memory associated with the CP.

The checkout ID tag reader 42 may be situated near the checkout counter, within a sufficiently close physical range to where a shopping cart passes so as to automatically record the value of the ID tag (i.e., the cart ID value). When the ID tag is an RFID tag, the RFID read range is set to be less than the distance between checkout counters, and less than the distance between shopping carts in a queue, so that only an ID tag of a shopping cart currently being handled at the checkout counter is read at any given time by the checkout ID tag reader. When the ID tag is a visible tag, such as a character tag or bar code, the camera for acquiring the image of the visible Alternatively, a checkout clerk, or the shopper, at a self-checkout counter may operate the ID tag reader manually to record the respective value of the ID tag.

Subsequently, a checkout computer processor (CP) 44 processes the ID tag reader output. The computer process may confirm that the ID tag reader output is valid, for example, that a value provided by the reader exists in a database of existing ID tag values. Camera output (i.e., an image or video) may be processed by optical character recognition (OCR) to determine a value of the visible character tag 28. The OCR processing may be performed by the camera itself or by an external processor, such as a processor configured to implement checkout CP 44. Hereinbelow, computer processes such as checkout CP 44 are understood to be executed on one or more computer processors, such as dedicated controllers, personal or mobile computers, distributed or centralized computer servers, or cloud-based systems. In one embodiment, each checkout counter may be equipped with a local computer for performing checkout CP 44, and which may also be configured to receive the values read by checkout ID tag reader 42 (i.e., the bar code reader, the RFID reader, and/or the camera) and to record a respective ID value of the shopping cart in a computer memory, such as a database of shopping cart values and approval records, as described further hereinbelow.

The checkout CP 44 is also typically connected to the checkout payment register 48, which may also include a keypad 46, or keyboard, at which a checkout clerk (i.e., cashier) operating the payment register may manually enter the characters and/or digits of the visible character tag 28, if the checkout ID tag reader 42 is not available or not working.

The checkout register 48 may also provide an authorization to the checkout CP 44 that a payment transaction, i.e., a payment for the products in the shopping cart, has been successfully completed. The checkout CP 44 then records in memory storage an approval record (also referred to herein as an "authorization record"), indicating that payment for the products in the shopping cart has been completed. The approval record typically includes the ID value of the shopping cart as determined by the ID tag. The approval may include additional relevant information, such as a time and date and a transaction identifier and/or payment amount. In some embodiments, the checkout CP 44 may be implemented within a processor of the checkout register. Alternatively, the checkout CP 44 may be implemented by an additional processor, which may be configured as a single CPU or processing device for each store checkout register, or as a central processor for multiple checkout registers of the store. The memory storage may include, for example, a system database.

Alternatively, rather than recording an approval record in memory storage, the checkout CP may signal the checkout ID tag reader 42 to write an approval indication to the electronic ID tag 26 of the shopping cart.

From the checkout counter, the shopper proceeds with the shopping cart to the store exit 16. At the exit, an exit ID tag reader 62, similar to the checkout ID tag reader 42, automatically reads at least one electronic ID tag of the one or more ID tags of the shopping cart. Note that if the shopping cart has more than one ID tag, the exit ID tag 62 reader may be configured to read a different ID tag than the checkout ID tag reader 42.

The cart ID value that is read may be received from the exit ID tag reader 62 by an exit CP 64. The exit CP 64 may implemented on the same processor as the CP 44. Alternatively, the checkout CP 44 and the exit CP 64 may run on separate processors, and they communicate with each other such that the value of the cart ID is compared with the records of approved carts. For example, each time a new shopping cart record is approved by the checkout CP 44, the checkout CP 44 may send the new approved record to the exit CP 64, to be stored at the CPU 64. Alternatively, the exit CP 64 may send a query to the checkout CP 44 upon determining an ID of a new shopping cart at the exit, in order to query the approval records. In either case, if the ID of the shopping cart is indicated in the records of the authorized (i.e., "approved") shopping carts, the exit CP 64 allows the shopping cart to exit 16 without blocking the exit, for example, by opening an automatic barrier, such as an automatic door 66.

In further embodiments, the checkout CP may be configured to signal the checkout ID tag reader 42 to write an approval indication to the electronic ID tag 26 (or to a second electronic ID tag of the shopping cart dedicated to storing the approval indication). The exit ID tag reader 62 may be configured to read the approval indication from the electronic ID tag 26, thereby confirming that the shopping cart is approved to exit. The exit ID tag reader 62 may also reset the approval indication of the electronic ID tag 26 after signaling the exit CP 64 to open the automatic barrier. Once the approval indication is reset, the cart (after being returned to the store) must again pass the cashier before exiting.

If the shopping cart is not listed in the records of approved shopping cart, the exit CP 64 may prevent opening of the automatic door 66, or may otherwise maintain a similar barrier, such as gate, turnstile, or bollard. The exit CPU 64 may also issue an alert, such as an audible or visible alert device 68. The alert device 68 may be, for example, a light or a speaker, or both. In some embodiments, alert device 68 is a light that is green when an approved shopping cart passes and then turn is red, for example a flashing red, when an unapproved shopping cart passes. The full process of checkout and verification is described further hereinbelow. It should be noted that automatic doors 66 may be opened by the CP 64 upon verification that the shopping cart is an approved shopping cart. Alternatively, or additionally, there may be at the exit, a turnstile, similarly configured to allow a shopper with a shopping cart to pass only if the shopping cart is approved. Alternatively, the exit mechanism (e.g., door or turnstile) may be activated without verification (i.e., not operated by the exit CP 64, but for example by a standard proximity sensor). Rather than operating an exit mechanism, the exit CP 64, upon identifying a shopping cart that lacks approval (e.g., identification of a cart that does not have an approval record), may issue an alert, for example, by activating an audible or visible alert device 68. The alert device 68 may be for example a light or a speaker, or both. In some embodiments, alert device 68 is a light that may be configured to signal verification or non-verification with different colors. For example, green may be lit when an approved shopping cart passes and red may be lit if there is no verification, or, for example, a flashing red light may be used to indicate an unapproved shopping cart passing. Alternatively, or additionally, upon determining a lack of approval, the exit CP may issue an electronic alert, such as communicating a message to an "alert device" that is a computer station or mobile device of a store staff or manager, who may then manually determine whether the shopper has or has not paid for the products in the shopping cart.

Figure 2:
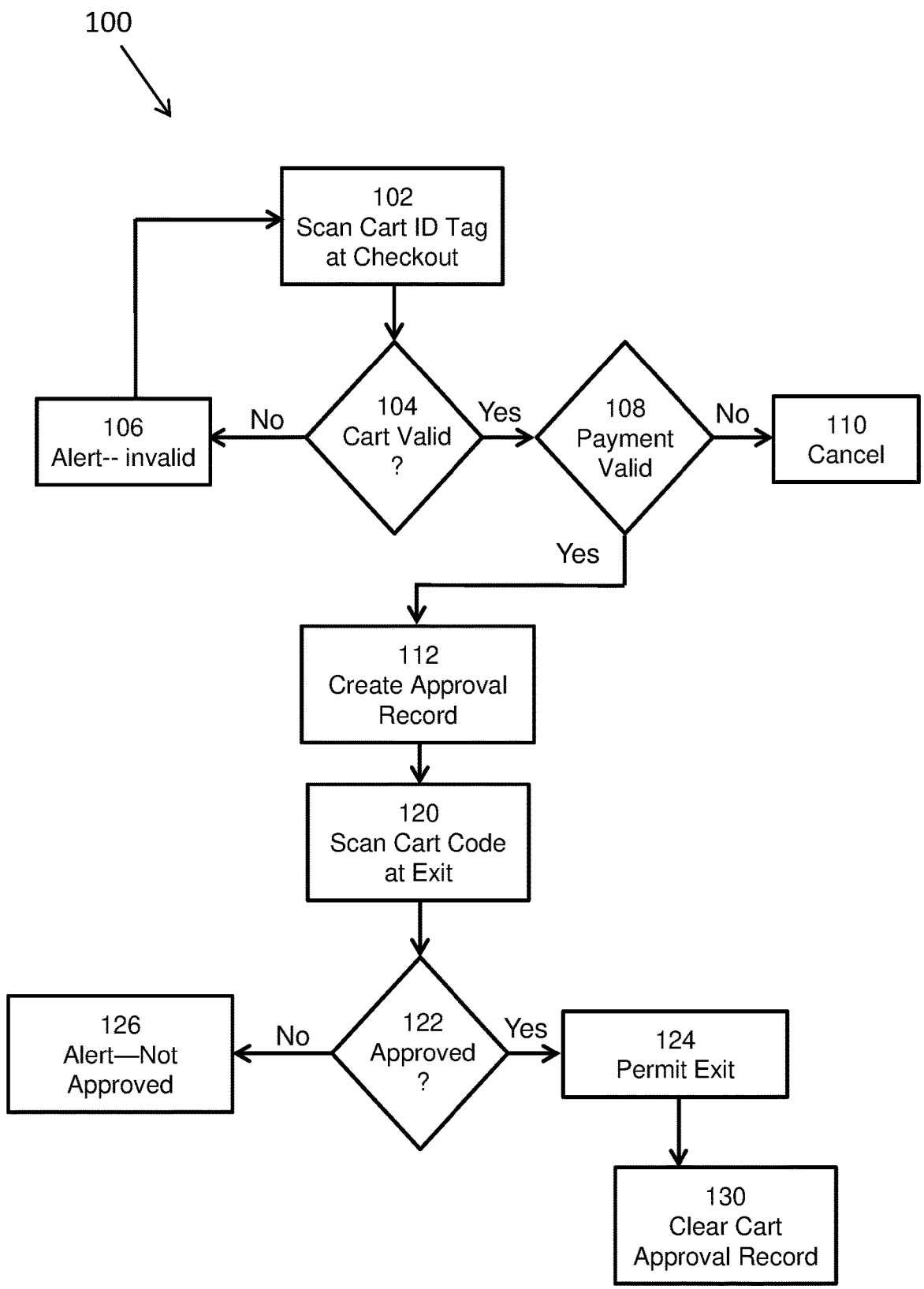
FIG. 2 is a flow diagram of a process of a shopping checkout system for verifying shopper payment, in accordance with embodiments of the present invention.

FIG. 2 is a flow diagram of a process 100 of a shopping checkout system for verifying shopper payment, in accordance with embodiments of the present invention.

At a step 102, a shopping cart having an ID tag reaches the checkout counter and the shopping cart ID tag is scanned by one or more checkout ID tag readers. As described above, the ID tag may be a bar code (including, for example, a QR code tag), an electronic ID tag (for example, an RFID, NFC, or magnetic tag), and/or a visible character tag. The checkout ID tag reader may be a bar code reader, an RFID tag reader, a magnetic tag reader, and/or a camera. In some embodiments, multiple ID tags may be affixed to shopping carts.

Typically scanning is performed automatically by an ID tag reader positioned in a fix position at or near the checkout counter. Alternatively, a checkout clerk, or the shopper at a self-checkout counter, may manually point an ID tag reader towards the ID tag to acquire a scan of the ID tag. Alternatively, or when the automatic scanning fails, a checkout clerk (or the shopper for self-checkout) may enter the value of the visible character tag on a numeric, or alphanumeric, keyboard.

At a step 104, a checkout computer processor (CP) may process the ID tag reader output and validate the ID tag reader output by confirming, for example, that the value of the ID tag is in a database of ID tag values. The checkout CP may also process an image of a visible character tag by OCR to determine a value of the visible character tag. If the tag value is not valid, then, at a step 106, the checkout clerk and/or the shopper are alerted that the tag was not validated. Additional scans may be attempted and a store manager, for example, may be notified if validation after multiple attempts is not possible.

If the tag is validated, then, at a step 108, the checkout CP receives an indication of payment approval, either by being entered manually by a checkout clerk, or transmitted manually, for example from the checkout register. If the payment is not approved, then, at a step 110, the transaction is cancelled. Otherwise, at a step 112, the checkout CP sets an approval flag, or an approval record associated with the value of the ID tag (i.e., the ID value of the cart). Typically, this approval record is saved in a file or database, which may be accessible to the exit CP either directly or by querying the checkout CP. Alternatively, as described above, the checkout CP may signal the checkout ID tag reader to write an approval indication to the RFID of the shopping cart.

At a step 120, the shopper proceeds with of the shopping cart to the store exit (or to one of multiple store exits that may be configured similarly), where the ID tag is read by an exit ID tag reader. The exit CP then receives the ID value and at a step 122 queries the records of approved shopping carts. Alternatively, if an approval indication is written to the cart RFID, the exit ID tag reader may be configured to read the approval indication, confirming that the shopping cart is approved to exit.

If the ID value is valid, then at a step 124, the exit CP may operate the exit mechanism (e.g., automatic doors) to allow the shopping cart to exit. Alternatively, or additionally, an alert device, such as an exit light or speaker, may be triggered to indicate that shopping card is approved, for example by lighting a green light.

If the query by the exit CP indicates that the shopping cart is not approved, then at a step 118, the alert device may be triggered to signal the lack of approval, for example by sounding a warning sound or flashing a red light, or by providing an electronic indication to a store supervisor or other store staff. (Note that whereas the exit doors are operated at step 124 when the shopping cart is approved, at step 118 the exit doors are typically not opened.)

At a step 130, once a cart has been permitted to exit, the exit CP may delete or amend the approval record to indicate that the shopping cart must be re-approved before exiting again. In some embodiments, a separate entrance ID tag reader performs the task of scanning shopping cart entering the store. A log file may also be maintained including additional information such as when a cart was authorized, when it left a store, and when it subsequently was returned.

Although the present cart and system are described herein with respect to a store environment, such as a supermarket, it should be understood that the cart and system could be implemented in a warehouse (to control inventory, prevent theft, etc.) or other appropriate settings. As such, the cart and system can be considered to provide the application of a platform for collecting and subsequently distributing products. The front-end device or application implementing the above-described method may be an add-on, or upgrade, or a retrofit to a commercial systems for checkout processing.

Processing elements of the system described herein, with respect to system 20 and process 100, may be implemented in digital electronic circuitry, or in computer hardware, firmware, software, or in combinations thereof. Such elements can be implemented as a computer program product, tangibly embodied in an information carrier, such as a non-transient, machine-readable storage device, for execution by, or to control the operation of, data processing apparatus, such as a programmable processor, computer, or controller. Such a computer program may be deployed to be executed on multiple computers at one site or one or more across multiple sites. Memory storage for software and data may include multiple one or more memory units, including one or more types of storage media. Examples of storage media include, but are not limited to, magnetic media, optical media, and integrated circuits such as read-only memory devices (ROM) and random access memory (RAM). Network interface modules may control the sending and receiving of data packets over wired or wireless networks known in the art. Method steps associated with the system and process can be rearranged and/or one or more such steps can be omitted to achieve the same, or similar, results to those described herein.

It is to be understood that the embodiments described hereinabove are cited by way of example, and that the present invention is not limited to what has been particularly shown and described hereinabove.

What is claimed:

1. A system for shopping checkout comprising:
    a shopping cart, on which is affixed a shopping cart electronic identification (ID) tag;
    a checkout counter comprising: a checkout ID tag reader, a payment register and a checkout processor, wherein the checkout processor is configured to execute a first set of instructions, from non-transient system storage, to receive payment approvals from the payment register, to receive an ID value of the shopping cart electronic ID tag, and responsively to signal the checkout ID tag reader to write an approval indication to the electronic ID tag; and
    a store exit comprising an exit ID tag reader, an exit processor, and an automatic barrier, wherein the exit processor is configured to execute a second set of instructions, from the non-transient system storage, to determine an ID value of the shopping cart electronic ID tag from output of the exit ID tag reader, to read the approval indication from the electronic ID tag, confirming that the shopping cart is approved to exit, responsively to the approval, to open the automatic barrier to permit the shopping cart to exit, and to signal the exit ID tag reader to reset the approval indication of the electronic ID tag to require the shopping cart to subsequently pass the checkout counter before re-exiting.

2. The system of claim 1, wherein the shopping cart electronic ID tag comprises an RFID tag and wherein the exit ID tag reader is an RFID reader.

3. The system of claim 1, wherein the store exit further comprises an alert device and wherein the exit processor is further configured to signal a lack of approval at the alert device by issuing an electronic, visual, or audible alert.

4. The system of claim 1, wherein the checkout processor receives the value of the shopping cart ID tag from the checkout ID tag reader.

5. The system of claim 1, wherein the automatic barrier is one of a door, gate, turnstile, or bollard.

6. A method for shopping checkout comprising:
    affixing a shopping cart electronic identification (ID) tag to a shopping cart;
    at a checkout counter having a checkout ID tag reader, a payment register and a checkout processor, receiving, at the checkout processor, payment approval from the payment register and a value of the shopping cart electronic ID tag, and responsively signaling the checkout ID tag reader to write an approval indication to the electronic ID tag; and,
    at a store exit having an exit ID tag reader, an exit processor, and an automatic barrier, determining at the exit processor a value of the shopping cart electronic ID tag from output of the exit ID tag reader, reading the approval indication from the electronic ID tag, confirming that the shopping cart is approved to exit, responsively to the approval, opening the automatic barrier to permit the shopping cart to exit, and signaling the exit ID tag reader to reset the approval indication of the electronic ID tag to require the shopping cart to subsequently pass the checkout counter before re-exiting.

7. The method of claim 6, wherein the shopping cart electronic ID tag comprises an RFID tag and wherein the exit ID reader is an RFID reader.

8. The method of claim 6, further comprising signaling a lack of approval at an alert device by issuing an electronic, visual, or audible alert.

9. The method of claim 6, further comprising receiving, at the checkout processor, the value of the shopping cart ID tag from the checkout ID tag reader.

10. The method of claim 6, further comprising operating the automatic barrier according to whether or not the ID value corresponds to the stored shopping cart approval records, and wherein the automatic barrier is one of a door, gate, turnstile, or bollard.

* * * * *